(12) United States Patent
Satpathy et al.

(10) Patent No.: US 9,996,708 B2
(45) Date of Patent: Jun. 12, 2018

(54) SMS4 ACCELERATION PROCESSORS HAVING ENCRYPTION AND DECRYPTION MAPPED ON A SAME HARDWARE

(71) Applicant: Intel Corporation, Santa Clara, CA (US)

(72) Inventors: Sudhir K. Satpathy, Hillsboro, OR (US); Sanu K. Mathew, Hillsboro, OR (US); Kirk S. Yap, Westborough, MA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 14/751,995

(22) Filed: Jun. 26, 2015

(65) Prior Publication Data

US 2016/0379014 A1  Dec. 29, 2016

(51) Int. Cl.
*G06F 11/30* (2006.01)
*G06F 12/14* (2006.01)
*G06F 21/74* (2013.01)
*G09C 1/00* (2006.01)
*H04L 9/06* (2006.01)

(52) U.S. Cl.
CPC .............. *G06F 21/74* (2013.01); *G09C 1/00* (2013.01); *H04L 9/0631* (2013.01); *H04L 2209/122* (2013.01)

(58) Field of Classification Search
CPC ...... G06F 21/72; G06F 21/602; G06F 21/123; G06F 21/74; G07B 2017/00741; H04L 9/0618; H04L 9/0625; H04L 9/0631; H04L 9/0637; H04L 9/0675; H04L 9/0693; H04L 2209/12; H04L 2209/122; H04L 2209/125; H04L 2209/16; H04L 2209/24; G09C 1/00
See application file for complete search history.

(56) References Cited

U.S. PATENT DOCUMENTS

| | | | | |
|---|---|---|---|---|
| 2003/0133568 A1* | 7/2003 | Stein | ...................... | H04L 9/0631 380/37 |
| 2005/0213766 A1* | 9/2005 | Goss | ....................... | G06F 21/72 380/277 |
| 2005/0271204 A1* | 12/2005 | Chu | ....................... | H04L 9/0631 380/44 |
| 2008/0232581 A1* | 9/2008 | Elbaz | ....................... | H04L 9/065 380/42 |
| 2015/0172043 A1* | 6/2015 | Li | ......................... | H04L 9/0631 380/30 |

\* cited by examiner

*Primary Examiner* — Trong Nguyen
(74) *Attorney, Agent, or Firm* — Lowenstein Sandler LLP

(57) ABSTRACT

A processing system includes a processing core and a hardware accelerator communicatively coupled to the processing core. The hardware accelerator includes a data register having a plurality of data bits and a key register having a plurality of key bits. The hardware accelerator also includes a data mode selector module to select one of an encrypt mode or a decrypt mode for processing the plurality of data bits. The hardware accelerator further includes a key mode selector module to select one of the encrypt mode or the decrypt mode for processing the plurality of key bits.

20 Claims, 12 Drawing Sheets

SMS4 ACCELERATION PROCESSORS HAVING ENCRYPTION AND DECRYPTION MAPPED ON A SAME HARDWARE

TECHNICAL FIELD

The embodiments of the disclosure relate generally to a computing device, and, more specifically, relate to SMS4 acceleration processors for performing cryptography in processors such that encryption and decryption are mapped on a same hardware.

BACKGROUND

Cryptology is a technology often used to protect confidential or secret information in computer systems and other electronic devices. Cryptology generally involves using a cryptographic algorithm and a cryptographic key to protect the information. For example, encryption (sometimes referred to as cipher) may be performed in which a series of transformations or operations as specified by the cryptographic algorithm are performed on unencrypted or plaintext input data (e.g., a string of bits representing text, numbers, intelligible characters, etc.) using an encryption key (e.g., a string of bits) to produce encrypted data. The encrypted data is also sometimes referred to as cipher text or cipher data. The encrypted data is generally unintelligible. It is generally not possible, or at least not practically feasible, to determine the unencrypted plaintext data from the encrypted data, without knowing the cryptographic key. If the cryptographic key is known, decryption (sometimes referred to as inverse cipher) may be performed on the encrypted data to reproduce the corresponding plaintext or unencrypted data. The transformations or operations performed during decryption may be substantially the reverse of those performed during encryption.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

SMS4 is a block cipher cryptographic algorithm that is employed for data encryption/decryption in wireless networks. SMS4 data encryption operation may comprise a plurality of encryption rounds. Each round involves a number of different data manipulation operations that are performed in order to transform the input data (plaintext) into the encrypted data (cipher text). Data decryption operation may comprise a plurality of decryption rounds involving a number of similar data manipulation operations.

Conventional SMS4 accelerators use separate hardware logics such as substitute box (Sbox) modules to a 32-bit input data value and 32-bit input key value to perform the encryption and decryption operations. The 32-bit value may be logically partitioned into four 8-bit segments or bytes each of which is passed through the Sbox operation to perform a non-linear substitution on the input 8-bit segment to generate a replacement or substitute 8-bit segment, and output the replacement or substitute 8-bit segment.

Aspects of the present disclosure reduce the number of S-box modules by allowing the encryption and decryption operations to be mapped to the same hardware logics with little overhead. In an illustrative example, an SMS4 accelerator includes a mode selector, which is switchable to select key or data encryption or decryption operation.

Figure 1:
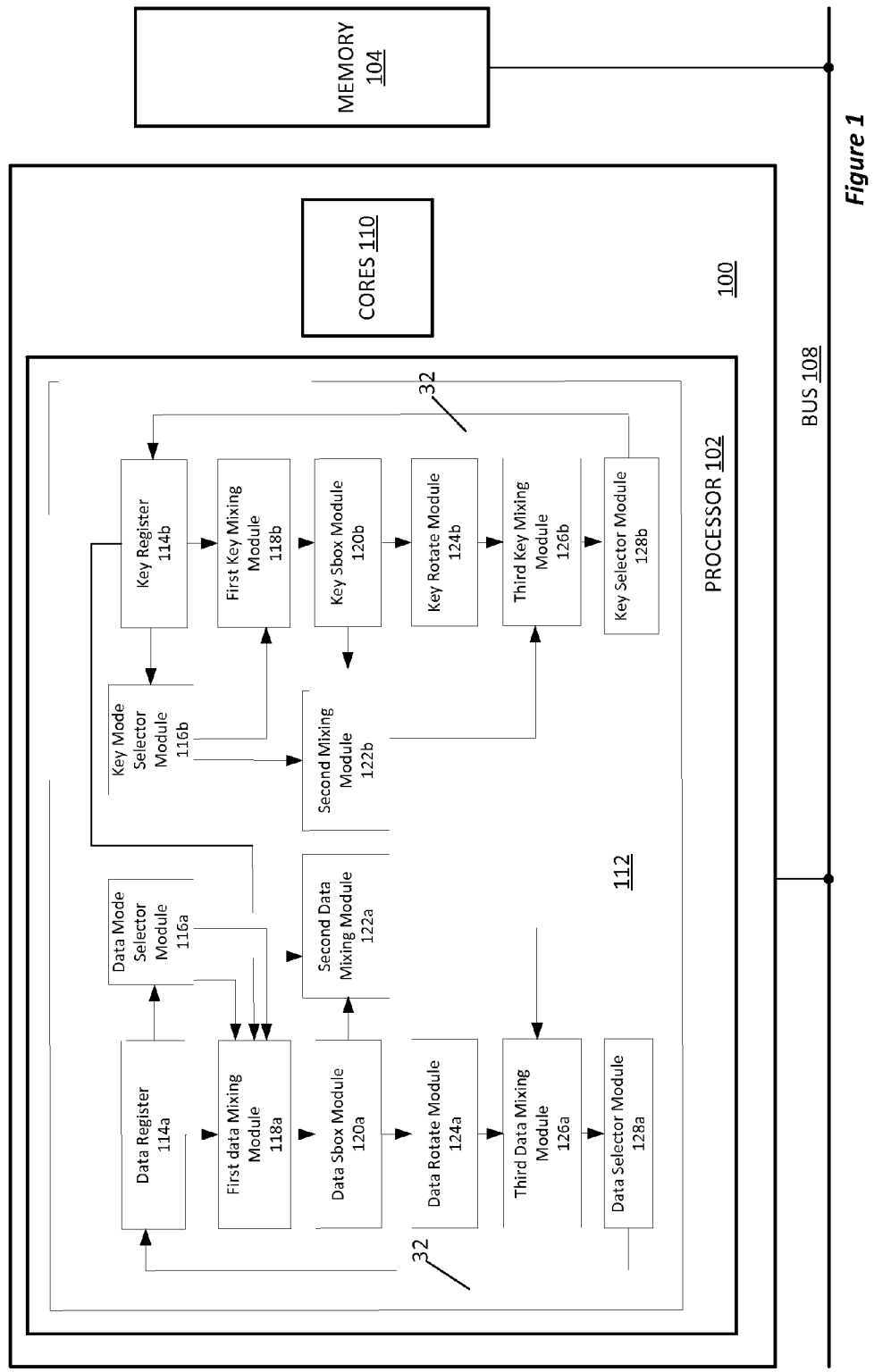
FIG. 1 illustrates a system-on-a-chip (SoC) including a processing system to perform cryptography according an embodiment of the present disclosure.

FIG. 1 illustrates a system-on-a-chip (SoC) 100 including a processing system to according an embodiment of the present disclosure. The SoC 100 may include a processor (such as a central processing unit (CPU)) 102 and a memory that are connected to each other via a bus system 108. The processor 102 may execute tasks such as system applications and user applications using the memory 104 to store the instructions of the programs and data associated with the programs.

In one embodiment, the processor 102 may also include one or more processing cores 110 and a SMS4 hardware accelerator 112 communicatively coupled to the processing core 110. The SMS4 hardware accelerator 112 functions to allow encryption and decryption operations to be mapped on same hardware logic.

The SMS4 hardware accelerator 112 includes a data register 114a for storing input bit data including a plurality of data bits. The SMS4 hardware accelerator 112 also includes a data mode selector module 116a for selecting one of an encryption or decryption mode for processing the plurality of data bits. In one embodiment, the data selector module 116a includes a multiplexer to perform a byte mixing operation with respect to the plurality of data bits. In another embodiment, the data selector module 116a includes a multiplexer to perform a byte substituting operation with respect to the plurality of data bits. The SMS4 hardware accelerator 112 also includes a first data mixing module 118a to perform a first data mixing operation, based on the data mode selector module 116a, by combining the input bit data with a plurality of key bits from a key register 114b to output first mixed data. The first mixed data is processed by a data substitution-box (Sbox) module 120a to perform a Sbox operation to output a substitute data. The Sbox operation substitutes a byte by a unique byte as per the specification described in the SMS4 cipher standard. One way for implementing the Sbox operation is to store results for all 256 bytes on a die in a look up table. In one embodiment, in the Sbox operation, the input byte is used as an address to access a look-up table and the stored result is read out. The SMS4 hardware accelerator 112 also includes a second data mixing module 122a that performs a second data mixing operation by combining the substitute data with an output of the data mode selector module 116a to output a second mixed data. The second mixing operation adds a unique data word to the substituted word generated from the Sbox operation. The substitute data outputted from the data Sbox module 120a is further rotated by a data rotate module 124a to perform a data rotation operation to output a rotated data. In one embodiment, the data rotation operation is accomplished by swizzling the wires that carry Sbox outputs to a third (final) mixing module 126a as described further herein below. In one embodiment, the data is shifted by a certain number of bits.

The SMS hardware accelerator 112 also includes a third data mixing module 126a, which mixes the rotated data with the second mixed data to output a third mixed data. The third mixed data combines the primary Sbox output, the rotated Sbox outputs with a unique word from the data to generate a new word that replaces an existing word from the data. The third mixed data is then sent as an input to a data selector module 128a. The data selector module 128a selects certain data bytes of the plurality of data bits in the input data. As discussed above, the 128b data is split into 4 words of 32b each. Specifically, the data selector module 128a selects 1 word from the 4 words since 3 of the 4 words of the 32b are rotated to left or right in encryption or decryption mode as discussed above. The output of the data selector module 128a is then set as an input to the data register 114a and the process is repeated 32 round iterations. Following the 32$^{nd}$ round, the final selected data bits includes 32b data words of the encrypted or decrypted data.

The SMS4 hardware accelerator 112 also includes a key register 114b for storing the input key data including a plurality of key bits. The SMS4 hardware accelerator 112 also includes a key mode selector module 116b for selecting one of an encryption or decryption mode for processing the plurality of key bits. In one embodiment, the key selector module 116b includes a multiplexer to perform a byte mixing operation with respect to the plurality of key bits. In another embodiment, the key selector module 116b includes a multiplexer to perform a byte substituting operation with respect to the plurality of key bits. The SMS4 hardware accelerator 112 also includes a first key mixing module 118b, which performs a first key mixing operation by combining a constant key (CK) with the key that is selected either for an encryption or decryption to generate a first mixed key. CK is a 32b round constant. Each of the 32 rounds uses a unique constant. These 32 round constants are specified in the SMS4 standard. In one embodiment, the first key mixing operation adds a 32b round constant with 3 words out of the 4 words from the 32b key. The first mixed key is processed by a Key Sbox module 120b to perform a Sbox operation to output a substitute key. Similar to the Sbox operation described above with respect to the data, the Sbox operation substitutes a byte by a unique byte as per the specification described in the SMS4 cipher standard. One way for implementing the Sbox operation is to store results for all 256 bytes on a die in a look up table. In one embodiment, in the Sbox operation, the input byte is used as an address to access a look-up table and the stored result is read out. The SMS4 hardware accelerator 112 also includes a second key mixing module 122b, which performs a second mixing operation by combining the substitute key with an output of the key selector mode module 116b to output a second mixed key. The second mixing operation adds a unique key word to the substituted word generated from the Sbox operation. The substitute key outputted from the Key Sbox module 120b is further rotated by a key rotate module 124b to output a rotated key. In one embodiment, the key rotation operation is accomplished by swizzling the wires that carry Sbox outputs to a third (final) mixing module 126b as described further herein below. In one embodiment, the key is shifted by certain number of bits. The SMS hardware accelerator 112 also includes a third data mixing module 126b, which combines the rotated key with the second mixed key to output a third mixed key. The third mixed key data combines the primary Sbox output, the rotated Sbox outputs with a unique word from the key to generate a new word to replace an existing word from the key. The third mixed key is then sent as an input to a key selector module 128b. The key selector module 128b selects certain bytes of the plurality of key bits in the input key bits. As discussed above, the 128b key is split into 4 words of 32b each. Specifically, the key selector module 128b selects 1 key word from the 4 words since the remaining 3 of the 4 key words are shifted to left or right in encryption or decryption modes as discussed above. As such, only 1 of the key words is replaced by the final mixed word. The output of the key selector module 128b is then set as an input to the key register 114b and the process is repeated 32 round iterations. Each iteration uses a new key that is derived from the previous key using a similar set of operations. Although, not shown, a key-expansion for the very first round involves an extra addition with a 128b system constant. Following the 32$^{nd}$ round, the final selected key bits includes 32b key words of the encrypted or decrypted key.

Figure 2:
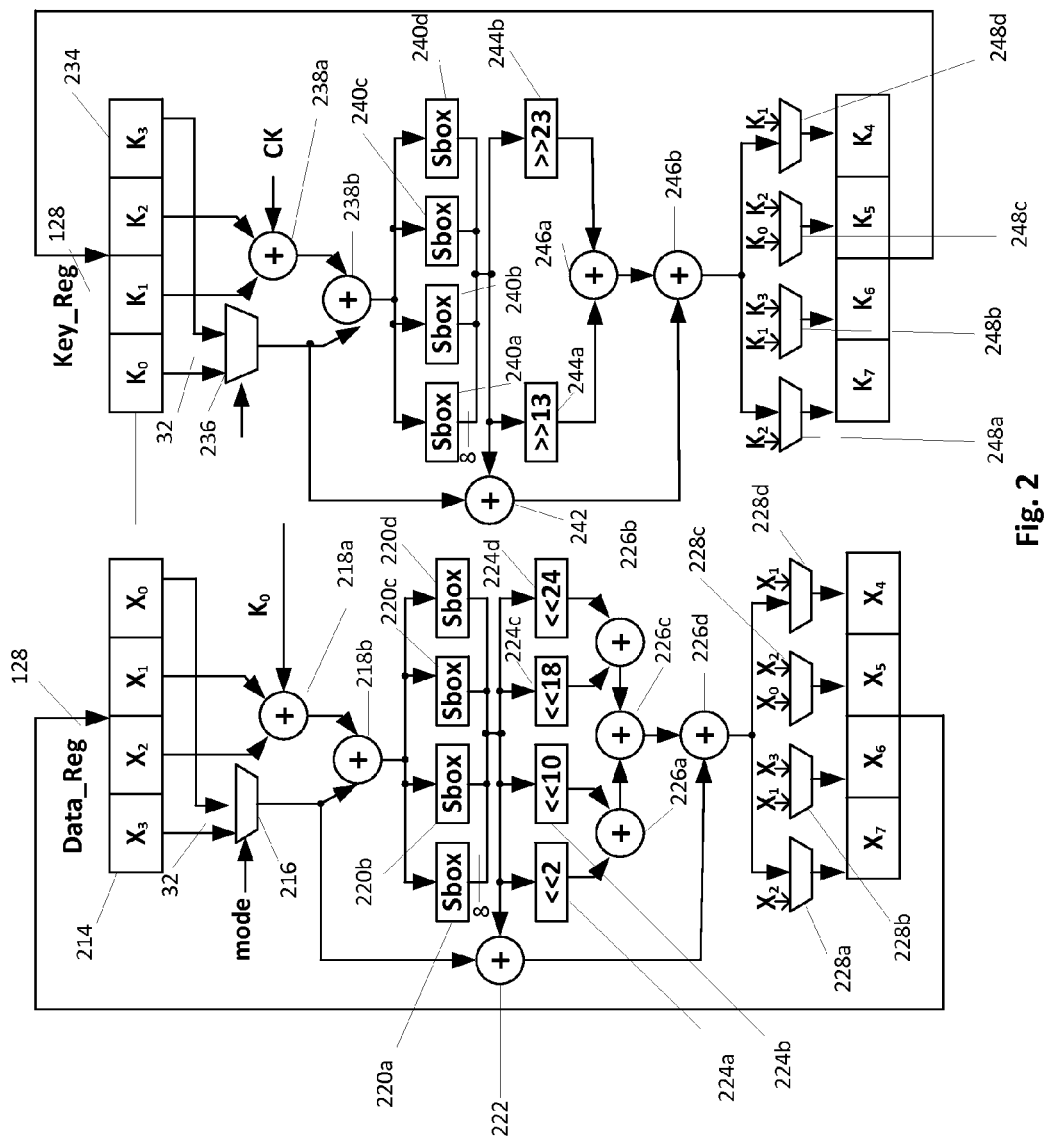
FIG. 2 illustrates an example of a detailed circuit diagram of a SMS4 accelerator in the processing system of FIG. 1 according to an embodiment of the present disclosure.

FIG. 2 illustrates a detailed circuit diagram of a SMS hardware accelerator 212 in accordance with an embodiment of the present disclosure. The SMS hardware accelerator 212 is same as the SMS hardware accelerator 112 of FIG. 1. As discussed above, the SMS4 hardware accelerator 212 functions to allow encryption and decryption operations to be mapped on same hardware logic. The SMS4 hardware accelerator 212 is a SMS4 block cipher that operates on a data and on a key. In one embodiment, the data is a 128 bits and the key is 128 bits.

The SMS4 hardware accelerator 212 includes a data register 214 having 128 bits of data, $X_0$, $X_1$, $X_2$, and $X_3$, each of which includes 32 bits of input data. The input data $X_0$ and $X_3$ data are sent to a multiplexer 216, which functions as a mode to select one of an encryption or decryption of the input data. The SMS4 hardware accelerator 212 also includes a first data mixing operation 218 having first add operations 218a and 218b. The first add operation 218a mixes the key (as described further below) with the input data $X_1$, $X_2$, which is further sent to the first add operation 218b. The first add operation 218b mixes the output of the first add operation 218a with the output of the multiplexer 216 to output a first mixed bits of data. The first mixed bits of data is sent to four Sbox operations 220a, 220b, 220c and 220d to output a substitute bits of data. Each of the four Sbox operations substitute 8 bits of data.

The SMS4 hardware accelerator 212 also includes a second data mixing operation 222, which mixes the substitute bits of data with an output of the multiplexer 216 to output second mixed bits of data. The substitute bits of data of the Sbox operations 220a, 220b, 220c and 220d are sent to rotation operations 224a, 224b, 224c and 224d respectively. The rotation operations 224 rotate the 32 bits of input data. For example, the rotation operation 224a shifts the 32 bit number into left by 2 bits, the rotation operation 224b shifts it left by 10 bits, the rotation operation 224c shifts it left by 18 bits and the rotation operation 224d shifts it left by 24 bits. The shifted output bits of data of the rotation operations 224a and 224b are sent to a third add operation 226a. The shifted data output of the rotation operations 224c and 224d is sent to another third add operation 226b. The outputs of the third add operations 226a and 226b are further sent to even another third add operation 226c. The output of the third add operation 226c is added with a second mixed bits of data in a further third add operation 226d to output a third mixed data. The third mixed data is a 128b data $X_0, X_1, X_2$, and $X_3$, each of which is 32 bits.

Each of the 32 bits data from $X_0, X_1, X_2$, and $X_3$ is sent as an input to multiplexers 228a, 228b, 228c, and 228d, which functions to select from this 32 bit data. In one embodiment, the data selected is based on whether the input data to be encrypted. In another embodiment, the data selected is based on whether the input data is to be decrypted. As shown, the output of the multiplexers includes $X_4, X_5, X_6$, and $X_7$, each of which includes 32 bits of the selected data. The output of the multiplexers 228 is then set as an input to the data register 214 and the process is repeated 32 round iterations. Following the $32^{nd}$ round, the final selected data includes 128 bits of data, which is one of the encrypted or decrypted data.

The SMS4 hardware accelerator 212 further includes a key register 234 having 128 bits of key, $K_0, K_1, K_2$, and $K_3$, each of which includes 32 bits of input key. The input keys $K_0$ and $K_3$ are sent to a multiplexer 236, which functions as a mode to select one of an encryption or decryption of the input key. The SMS4 hardware accelerator 212 also includes a first key mixing operation 238 having first add operations 238a and 238b. The first add operation 238a mixes a constant key (CK) with $K_1$, and $K_2$ to output a first mixed key, which is further sent to the first add operation 238b. The first add operation 238b mixes the output of the first add operation 238a with the output of the multiplexer 236a to output a first mixed bits of key. The first mixed bits of key is sent to be transformed by four Sbox operations 240a, 240b, 240c and 240d to output a transformed bits of key. Each of the four Sbox operations substitutes the 8 bits of key.

The SMS4 hardware accelerator 212 also includes a second data mixing operation 242, which mixes the substitute bits of key data with an output of the multiplexer 236 to output second mixed bits of key. The substitute bits of key of the Sbox operations 240a, 240b, 240c and 240d are sent to rotation operations 224a, and 224b. The rotation operations 244 rotate the 32 bits of input key. For example, the rotation operation 244a shifts the 32 bit number into right by 13 bits, the rotation operation 244b shifts it right by 23 bits. The shifted output bits of key data of the rotation operations 244a and 244b are sent to a third add operation 246a. The output of the third add operation 246a is further sent to another third add operation 246b. The another third add operation 246b adds the output of the third add operation 246a with a second mixed bits of key to output a third mixed data. The third mixed data is a 128b data of $K_0, K_1, K_2$, and $K_3$ each of which is 32 bits.

Each of the 32 bit key data of $K_0, K_1, K_2$, and $K_3$ is sent as an input to multiplexers 248a, 248b, 248c and 248d, which functions to select from this 32 bit key. In one embodiment, the key selected is based on whether the input key to be encrypted. In another embodiment, the key selected is based on whether the input key data is to be decrypted. As shown, the output of the multiplexers includes $K_4, K_5, K_6$, and $K_7$, each of which, include 32 bits of the selected key. The output of the multiplexers 248 is then set as an input to the key register 234 and the process is repeated 32 round iterations. Each iteration uses a new key that is derived from the previous key using a similar set of operations. Although, not shown, a key-expansion for the very first round involves an extra addition with a 128b system constant. Following the $32^{nd}$ round, the final selected key includes 128 bits of key, which is one of the encrypted or decrypted key.

Figure 3:
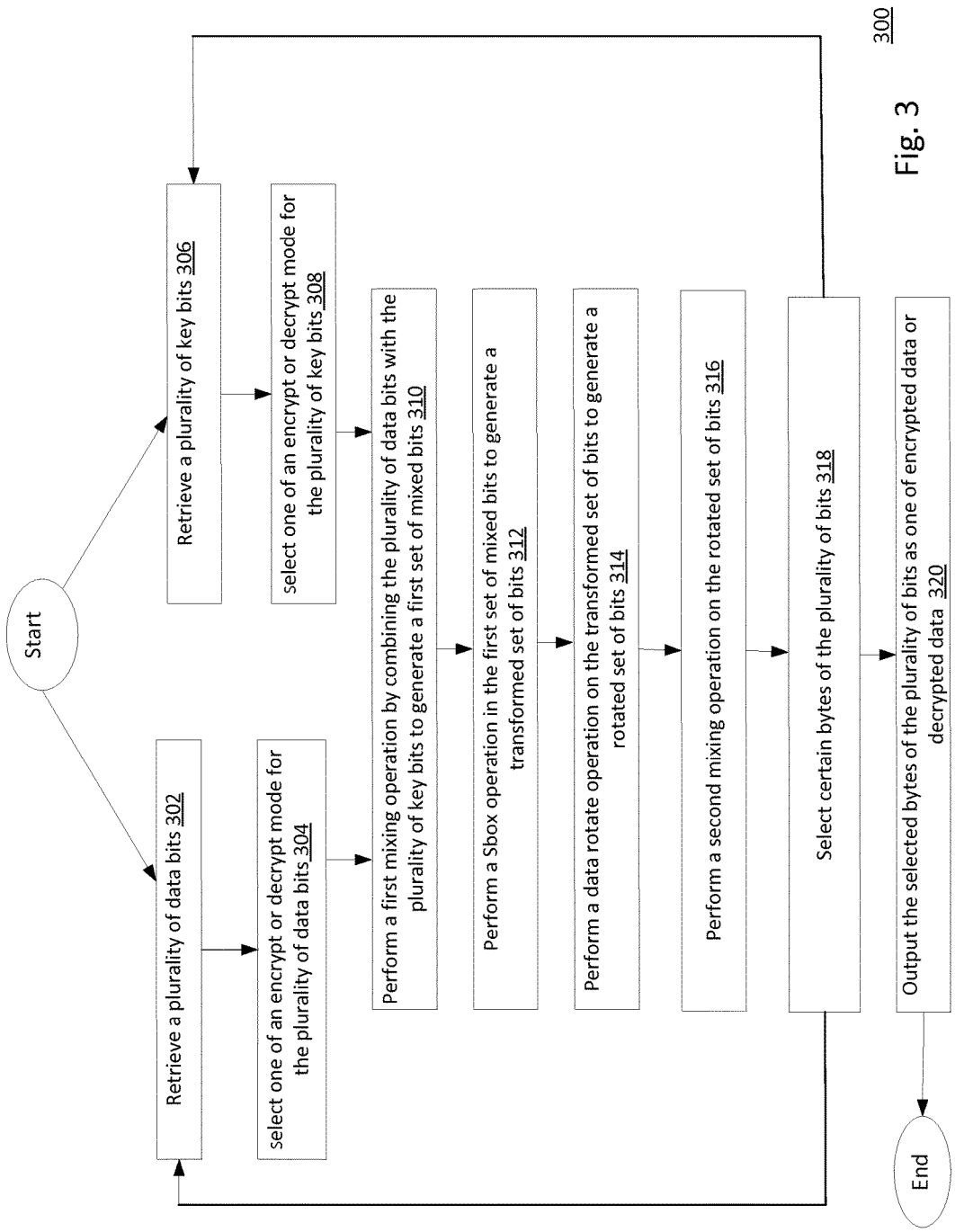
FIG. 3 illustrates a flow diagram of performing cryptography in processors such that encryption and decryption are mapped on a same hardware.

FIG. 3 illustrates a flow diagram of a method for performing cryptography in processors such that encryption and decryption are mapped on a same hardware according to an embodiment of the present disclosure. Method 300 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, method 300 may be performed, in part, by processing logics of any one of processing cores 110 executing an operating system with respect to FIG. 1.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 300 could alternatively be represented as a series of interrelated states via a state diagram or events.

Referring to FIG. 3, at block 302, the processing logic retrieves a plurality of data bits. In one embodiment, the plurality of data bits are stored in a data register. At block 304, the processing logic selects one of an encrypt mode or a decrypt mode for processing the plurality of data bits. At block 306, the processing logic retrieves a plurality of key bits. In one embodiment, a plurality key bits are stored in a key register. At block 308, the processing logic selects one of an encrypt mode or a decrypt mode for processing the plurality of key bits. At block 310, a first mixing operation is performed by combining a plurality of data bits and the key bits selected for one of the encryption and decryption mode to generate a first set of mixed bits. At block 312, a Sbox operation is performed in the first set of mixed bits to generate substitute set of bits. At block 314, the transformed set of bits are rotated to perform a data rotate operation to generate a rotated set of bits. At block 316, a second mixing operation is performed on the rotated data set of bits. As discussed above, the second mixing operation adds a unique word from data (from round computation) or key (for key expansion) to substitute word generated from the Sbox operation.

At block 318, certain bytes of the plurality of bits are selected. As discussed above, the 128b of the data bits is split into 4 words of 32b each. Specifically, the 1 word from the 4 words is selected since 3 of the 4 words of the 32b are rotated to left or right in encryption or decryption mode as discussed above. Similarly, as discussed above, the 128b of key bits are split into 4 words of 32b each. Specifically, 1 key word from the 4 words is selected since the remaining 3 of the 4 key words are shifted to left or right in encryption or decryption modes as discussed above. The method is repeated from block 302 and 306 for data bits and the key bits respectively. In one embodiment, the method is for 32 round iterations. Following the $32^{nd}$ round, at block 318, the selected data bytes of the plurality of bits are outputted as one of encrypted data or decrypted data.

Figure 4A:
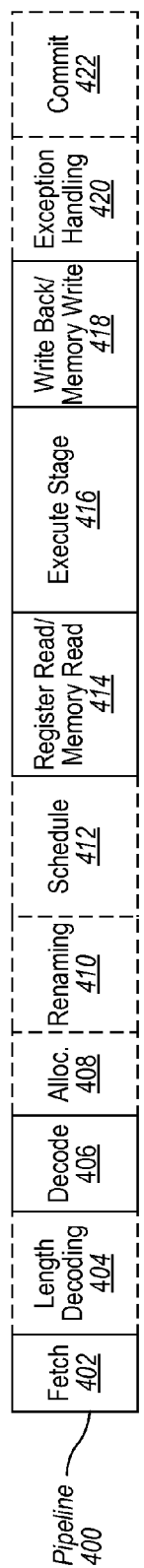
FIG. 4A is a block diagram illustrating a micro-architecture for a processor in which one embodiment of the disclosure may be used.

FIG. 4A is a block diagram illustrating an in-order pipeline and a register renaming stage, out-of-order issue/execution pipeline implemented by processing device 400 according to some embodiments of the disclosure. The solid lined boxes in FIG. 4A illustrate an in-order pipeline, while the dashed lined boxes illustrates a register renaming, out-of-order issue/execution pipeline. In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4A.

Figure 4B:
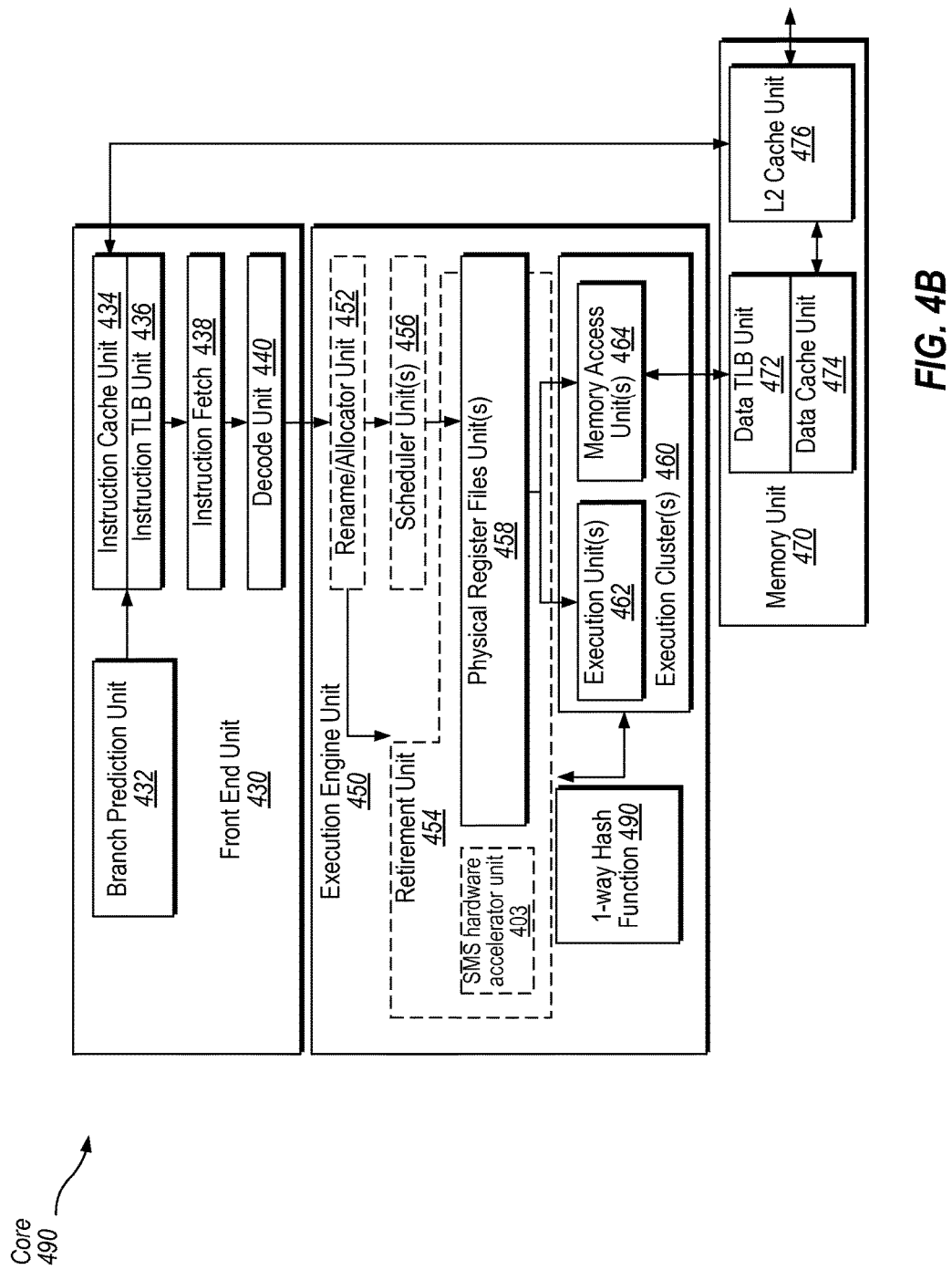
FIG. 4B is a block diagram illustrating an in-order pipeline and a register renaming stage, out-of-order issue/execution pipeline implemented according to at least one embodiment of the disclosure.

FIG. 4B is a block diagram illustrating a micro-architecture for a processor 400 that implements the processing device including heterogeneous cores in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470. The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The retirement unit 454 may include a SMS hardware accelerator unit 403 to perform cryptography in processors such that encryption and decryption are mapped on a same hardware according to embodiments of the invention. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 400 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
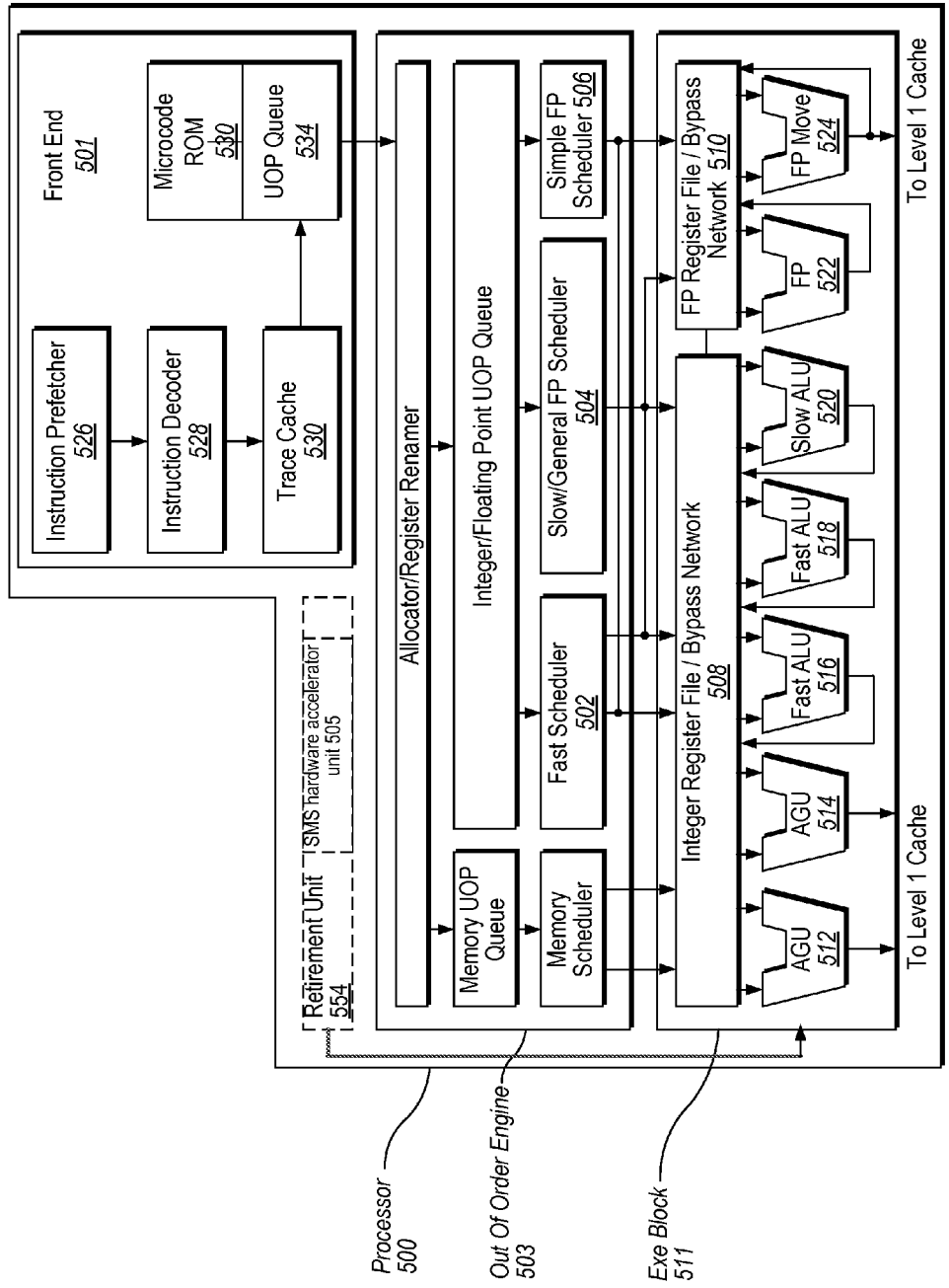
FIG. 5 illustrates a block diagram of the micro-architecture for a processor in accordance with one embodiment of the disclosure.

FIG. 5 illustrates a block diagram of the micro-architecture for a processor 500 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 501 is the part of the processor 500 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 64 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute.

The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 15, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement store address prediction for memory disambiguation according to embodiments of the disclosure. In one embodiment, the execution block 511 of processor 500 may include a store address predictor (not shown) for implementing store address prediction for memory disambiguation.

The processor 500 may include a retirement unit 554 coupled to the execution block 511. The retirement unit 554 may include SMS hardware accelerator unit 505 to perform cryptography in processors such that encryption and decryption are mapped on a same hardware according to embodiments of the invention The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
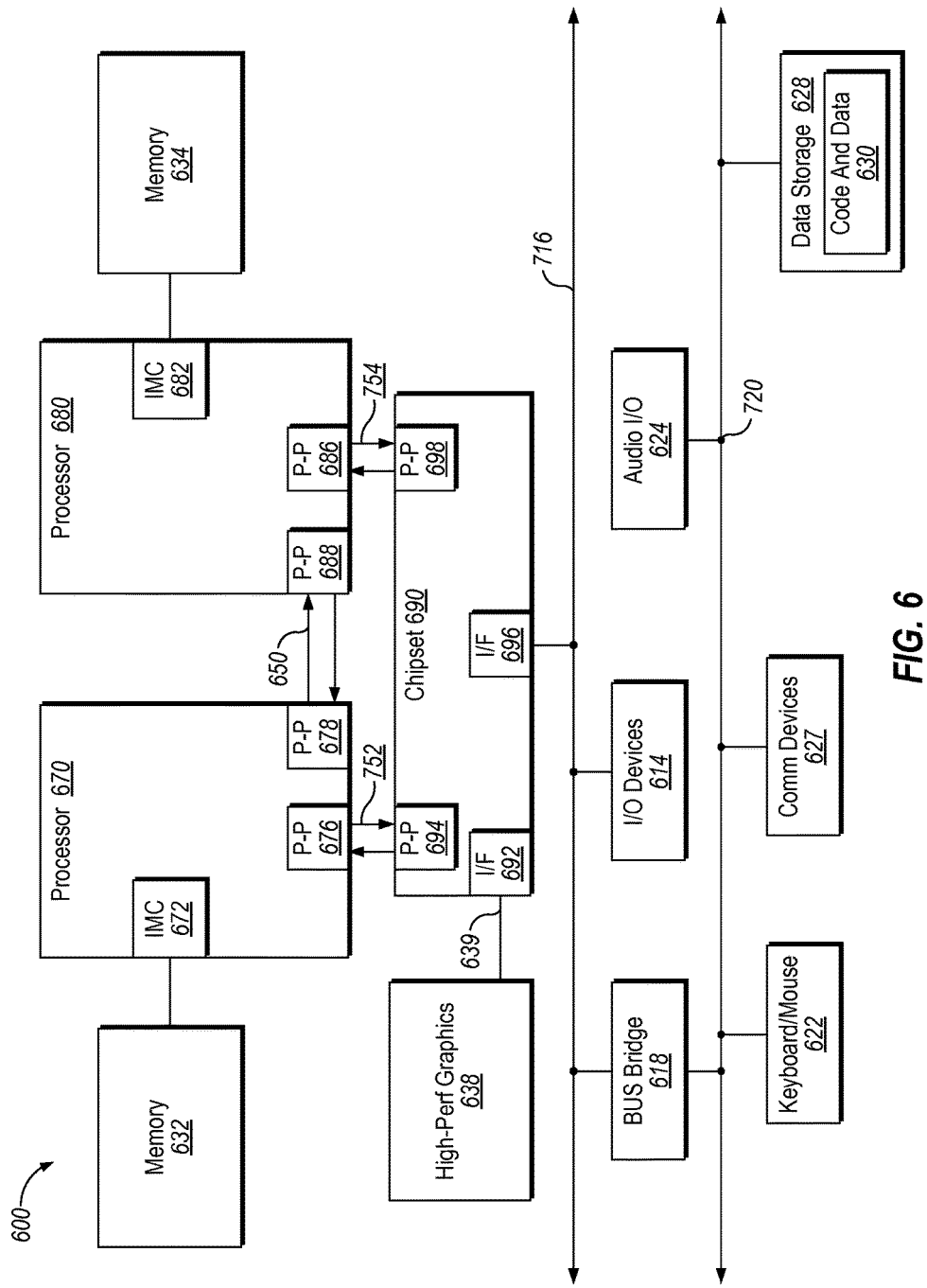
FIG. 6 is a block diagram illustrating a system in which an embodiment of the disclosure may be used.

Referring now to FIG. 6, shown is a block diagram illustrating a system 600 in which an embodiment of the disclosure may be used. As shown in FIG. 6, multiprocessor system 600 is a point-to-point interconnect system, and includes a first processor 670 and a second processor 680 coupled via a point-to-point interconnect 650. While shown with only two processors 670, 680, it is to be understood that the scope of embodiments of the disclosure is not so limited. In other embodiments, one or more additional processors may be present in a given processor. In one embodiment, the multiprocessor system 600 may implement hybrid cores as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
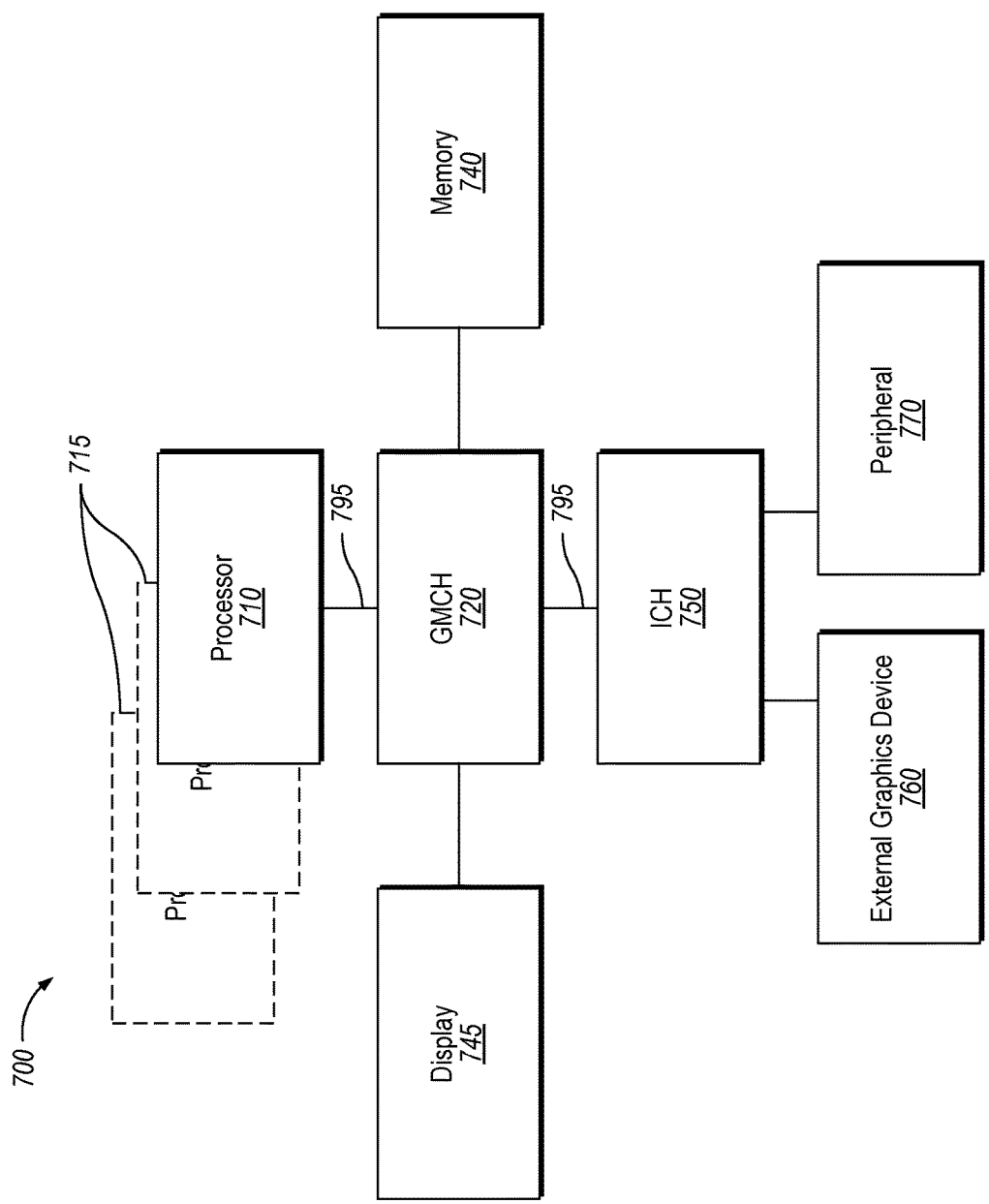
FIG. 7 is a block diagram of a system in which an embodiment of the disclosure may operate.

Referring now to FIG. 7, shown is a block diagram of a system 700 in which one embodiment of the disclosure may operate. The system 700 may include one or more processors 710, 715, which are coupled to graphics memory controller hub (GMCH) 720. The optional nature of additional processors 715 is denoted in FIG. 7 with broken lines. In one embodiment, processors 710, 715 implement hybrid cores according to embodiments of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device, coupled to ICH 750, along with another peripheral device 770.

Alternatively, additional or different processors may also be present in the system 700. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 8:
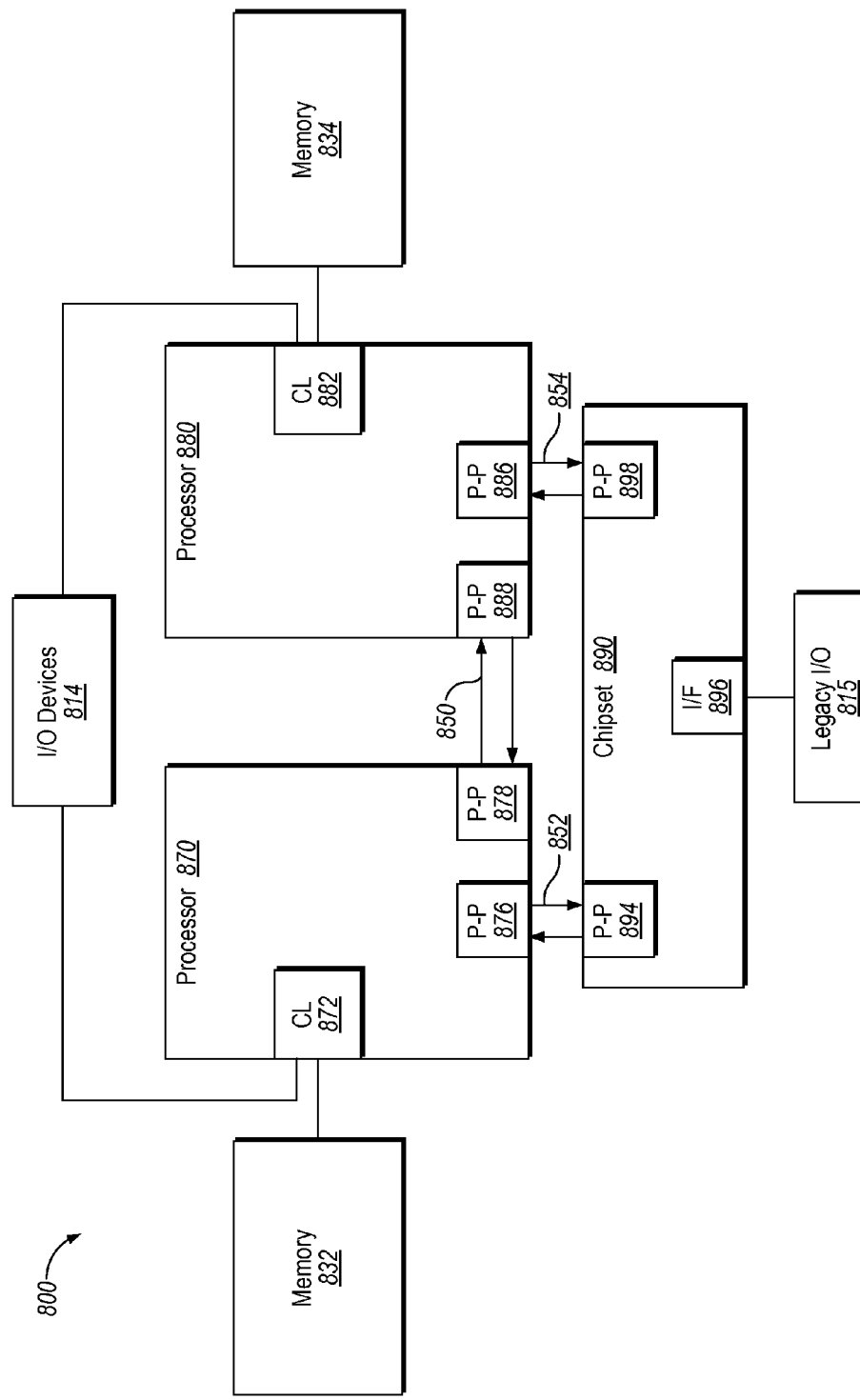
FIG. 8 is a block diagram of a system in which an embodiment of the disclosure may operate.

Referring now to FIG. 8, shown is a block diagram of a system 800 in which an embodiment of the disclosure may operate. FIG. 8 illustrates processors 870, 880. In one embodiment, processors 870, 880 may implement hybrid cores as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
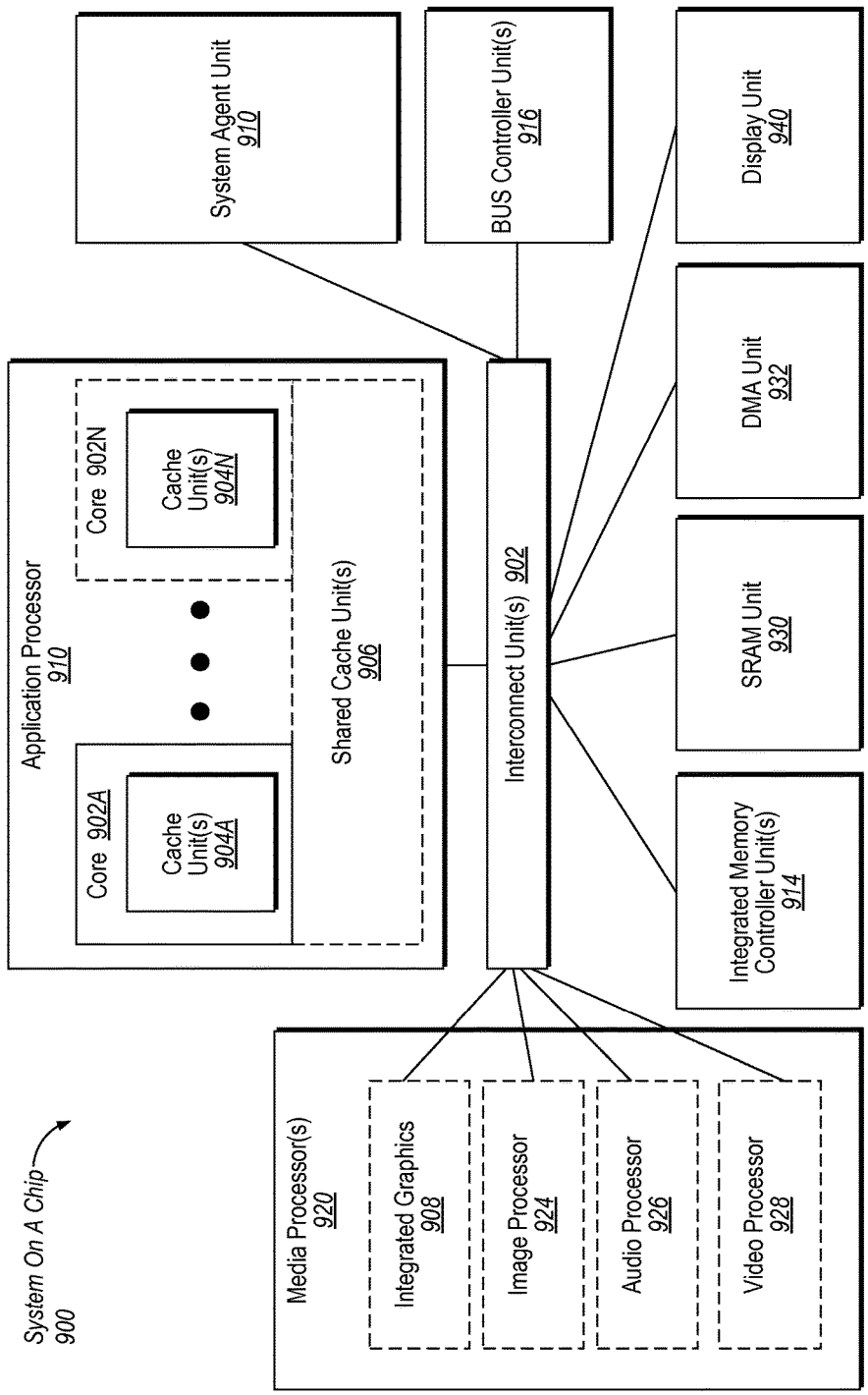
FIG. 9 is a block diagram of a System-on-a-Chip (SoC) in accordance with an embodiment of the present disclosure

Embodiments may be implemented in many different system types. FIG. 9 is a block diagram of a SoC 900 in accordance with an embodiment of the present disclosure. Dashed lined boxes are optional features on more advanced SoCs. In FIG. 9, an interconnect unit(s) 902 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a store address predictor for implementing hybrid cores as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, coprocessor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
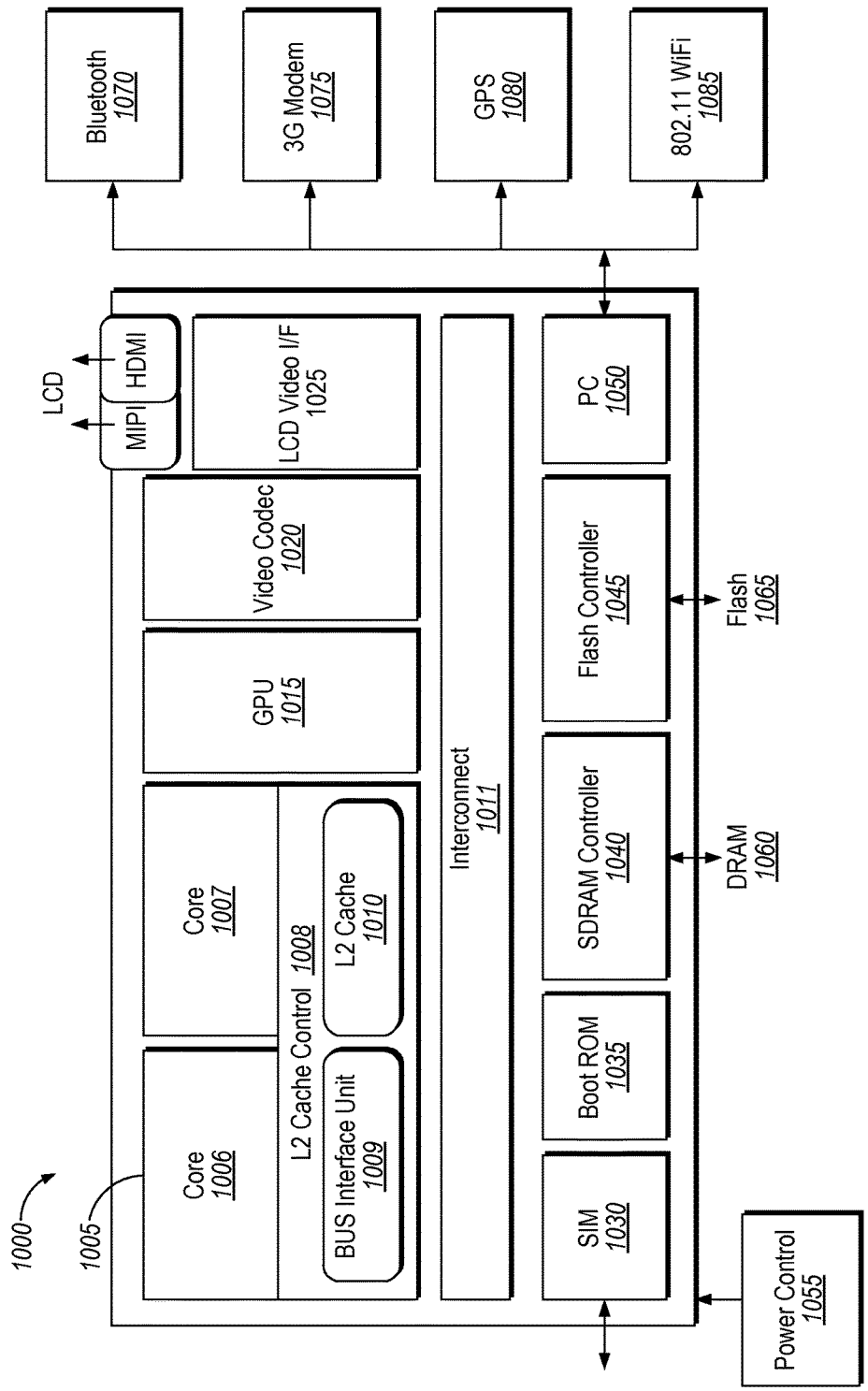
FIG. 10 is a block diagram of an embodiment of an SoC design in accordance with the present disclosure.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture CoreT™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1010 includes an on-chip interconnect, such as an IOSF, AMBA, or other interconnect discussed above, which potentially implements one or more aspects of the described disclosure. In one embodiment, cores 1006, 1007 may implement hybrid cores as described in embodiments herein.

Interconnect 1010 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
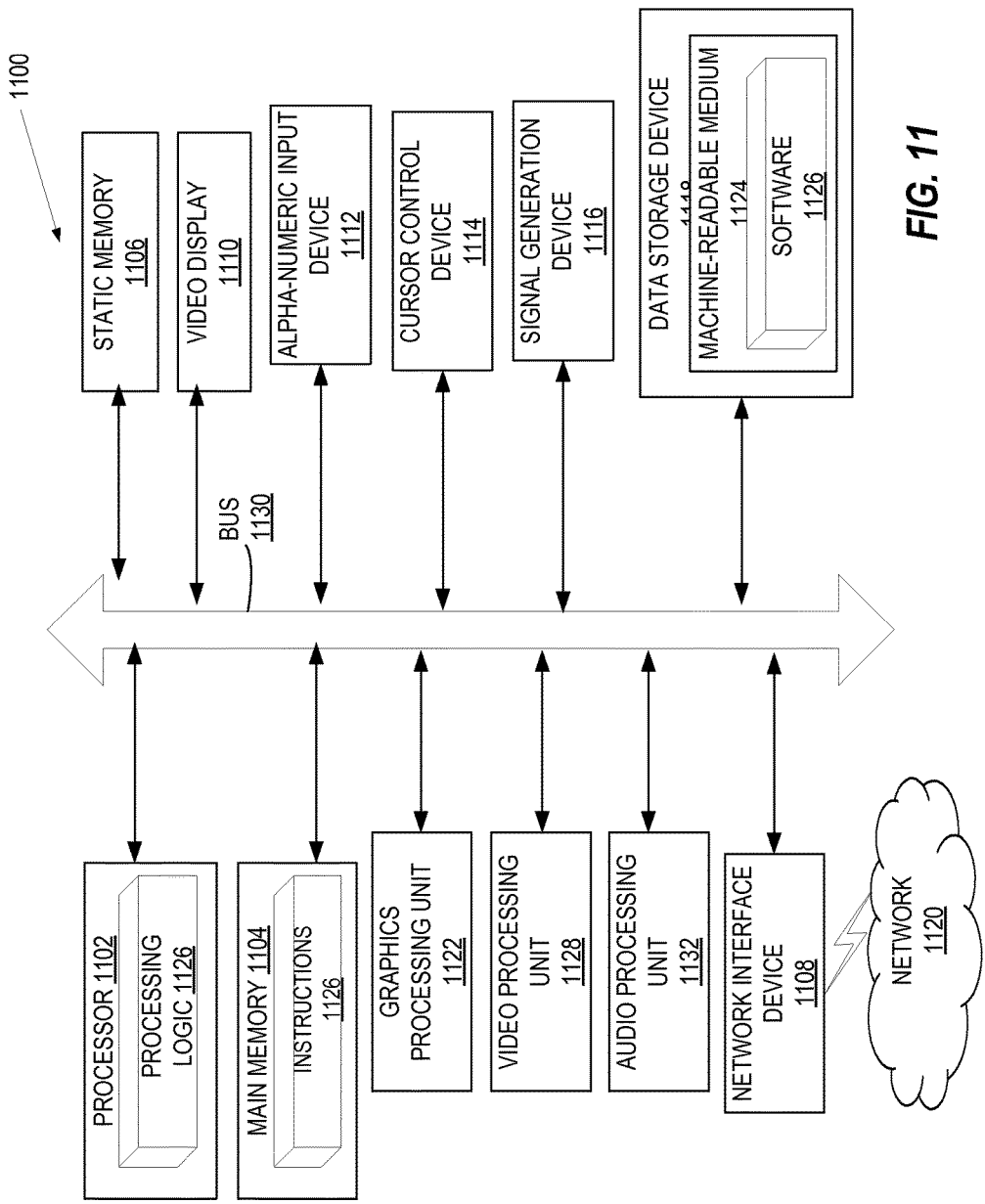
FIG. 11 illustrates a block diagram of one embodiment of a computer system.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or processing cores. The processing device 1102 is configured to execute the processing logic 1126 for performing the operations and steps discussed herein. In one embodiment, processing device 1102 is the same as processor architecture 100 described with respect to FIG. 1 as described herein with embodiments of the disclosure.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-accessible storage medium 1124 on which is stored software 1126 implementing any one or more of the methodologies of functions described herein, such as implementing store address prediction for memory disambiguation as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1126 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processing system comprising a processing core and a hardware accelerator communicatively coupled to the processing core, the hardware accelerator comprising a data register comprising a plurality of data bits; a data mode selector module to select one of an encrypt mode or a decrypt mode for processing the plurality of data bits; a key register comprising a plurality of key bits; and a key mode selector module to select one of the encrypt mode or the decrypt mode for processing the plurality of key bits.

In Example 2, the subject matter of Example 1 can optionally include wherein the data mode selector module comprises a multiplexer to perform at least one of a byte mixing operation or a byte substituting operation with respect to the plurality of data bits.

In Example 3, the subject matter of any one of Examples 1-2 can optionally include wherein the key mode selector module comprises a multiplexer to perform at least one of a byte mixing operation or a byte substituting operation with respect to the plurality of key bits.

In Example 4, the subject matter of any one of Examples 1-3 can optionally include wherein the hardware accelerator comprises a first mixing module to combine a plurality of the data bits with the plurality of key bits to generate a first mixed data.

In Example 5, the subject matter of any one of Examples 1-4 can optionally include wherein the hardware accelerator comprises a substitute box (S-box) module to perform a substitute operation by a table lookup.

In Example 6, the subject matter of any one of Examples 1-5 can optionally include wherein hardware accelerator further comprises a data rotation module to perform a data rotation operation.

In Example 7, the subject matter of any one of Examples 1-6 can optionally include wherein the plurality of data bits and the plurality of key bits are processed 32 times.

In Example 8, the subject matter of any one of Examples 1-7 can optionally include wherein the hardware accelerator further comprises a data selector module to select 32 bits of data words of the plurality of data bits.

Example 9 is a system-on-a chip (SoC) comprising a memory and a processing device communicatively coupled to the memory the processing device comprising a processing core and a hardware accelerator communicatively coupled to the processing core, the hardware accelerator comprising a data register comprising a plurality of data bits; a data mode selector module to select one of an encrypt mode or a decrypt mode for processing the plurality of data bits; a key register comprising a plurality of key bits; and a key mode selector module to select one of the encrypt mode or the decrypt mode for processing the plurality of key bits.

In Example 10, the subject matter of Example 9 can optionally include wherein the data mode selector module comprises a multiplexer to perform at least one of a byte mixing operation or a byte substituting operation with respect to the plurality of data bits.

In Example 11, the subject matter of any one of Examples 9-10 can optionally include wherein the key mode selector module comprises a multiplexer to perform at least one of a byte mixing operation or a byte substituting operation with respect to the plurality of key bits.

In Example 12, the subject matter of any one of Examples 9-11 can optionally include wherein the hardware accelerator comprises a first mixing module to combine a plurality of the data bits with the plurality of key bits to generate a first mixed data.

In Example 13, the subject matter of any one of Examples 9-12 can optionally include wherein the hardware accelerator comprises a substitute box (S-box) module to perform a substitute operation by a table lookup.

In Example 14, the subject matter of any one of Examples 9-13 can optionally include wherein the hardware accelerator further comprises a data rotation module to perform a data rotation operation; and a data selector module to select 32 bits of data words of the plurality of data bits.

Example 15 is a method comprising retrieving a plurality of data bits; selecting one of an encrypt mode or a decrypt mode for processing the plurality of data bits; retrieving a plurality of key bits; and selecting one of the encrypt mode or the decrypt mode for processing the plurality of key bits.

In Example 16, the subject matter of Example 15 can optionally include wherein the selecting one of the encrypt mode or decrypt mode for processing the plurality of data bits comprising performing at least one of a byte mixing operation or a byte substituting operation with respect to the plurality of data bits, wherein the selecting one of the encrypt mode or the decrypt mode for processing the plurality of key bits comprising performing at least one of a byte mixing operation or a byte substituting operation with respect to the plurality of key bits.

In Example 17, the subject matter of any one of Examples 15-16 can optionally include further comprising selecting 32 bits of data words of the plurality of data bits.

Example 18 is a non-transitory machine-readable storage medium including data that, when accessed by a processing device, cause the processing device to perform operations comprising retrieving a plurality of data bits; selecting one of an encrypt mode or a decrypt mode for processing the plurality of data bits; retrieving a plurality of key bits; and selecting one of the encrypt mode or the decrypt mode for processing the plurality of key bits.

In Example 19, the subject matter of Example 17 can optionally include wherein the selecting one of the encrypt mode or decrypt mode for processing the plurality of data bits comprising performing at least one of a byte mixing operation or a byte substituting operation with respect to the plurality of data bits, wherein the selecting one of the encrypt mode or the decrypt mode for processing the plurality of key bits comprising performing at least one of a byte mixing operation or a byte substituting operation with respect to the plurality of key bits.

In Example 20, the subject matter of any one of Examples 18-19 can optionally include wherein the operations further comprising the selecting one of the encrypt mode or decrypt mode for processing the plurality of data bits comprising performing at least one of a byte mixing operation or a byte substituting operation with respect to the plurality of data bits, wherein the selecting one of the encrypt mode or the decrypt mode for processing the plurality of key bits comprising performing at least one of a byte mixing operation or a byte substituting operation with respect to the plurality of key bits.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The invention claimed is:

1. A processing system comprising:
a processing core; and
a hardware accelerator communicatively coupled to the processing core, the hardware accelerator comprising:
a data register comprising a plurality of data bits;
a data mode selector circuit to select one of an encrypt mode or a decrypt mode for processing the plurality of data bits;
a key register comprising a plurality of key bits;
a key mode selector circuit to select one of the encrypt mode or the decrypt mode for processing the plurality of key bits;
a first data mixing circuit to combine at least the plurality of data bits with an output of the data mode selector circuit to generate a first mixed data;
a first key mixing circuit to combine at least the plurality of key bits with an output of the key mode selector circuit to generate a first mixed key;
a data substitute box (S-box) circuit to perform a data encrypt substitute operation on the first mixed data based on the encrypt mode selected by the data mode selector circuit and to perform a data decrypt substitute operation on the first mixed data based on the decrypt mode selected by the data mode selector circuit; and
a key S-box circuit to perform, in parallel operation with the data S-box circuit, a key encrypt substitute operation on the first mixed key based on the encrypt mode selected by the key mode selector circuit and to perform a key decrypt substitute operation on the first mixed key based on the decrypt mode selected by the key mode selector circuit;
wherein the data S-box circuit is separate from the key S-box circuit.

2. The processing system of claim 1, wherein the data mode selector circuit comprises a multiplexer to perform at least one of a byte mixing operation or a byte substituting operation with respect to the plurality of data bits.

3. The processing system of claim 1 wherein the key mode selector circuit comprises a multiplexer to perform at least one of a byte mixing operation or a byte substituting operation with respect to the plurality of key bits.

4. The processing system of claim 1, wherein the first data mixing circuit further to combine the plurality of data bits with the plurality of key bits to generate the first mixed data.

5. The processing system of claim 1, wherein the data S-box circuit to perform each of the data encrypt substitute operation and the data decrypt substitute operation using a table lookup and the key S-box circuit to perform the key encrypt substitute operation and the key decrypt substitute operation by a table lookup.

6. The processing system of claim 1, wherein the hardware accelerator further comprises:
a data rotation circuit to perform a data rotation operation.

7. The processing system of claim 1, wherein the plurality of data bits and the plurality of key bits are processed 32 times.

8. The processing system of claim 1, wherein the hardware accelerator further comprises:
a data selector circuit to select 32 bits of data words of the plurality of data bits.

9. A system-on-a chip (SoC) comprising:
a memory; and
a processor, communicatively coupled to the memory, comprising:
a processing core; and
a hardware accelerator communicatively coupled to the processing core, the hardware accelerator comprising:
a data register comprising a plurality of data bits;
a data mode selector circuit to select one of an encrypt mode or a decrypt mode for processing the plurality of data bits;
a key register comprising a plurality of key bits;
a key mode selector circuit to select one of the encrypt mode or the decrypt mode for processing the plurality of key bits;
a first data mixing circuit to combine at least the plurality of data bits with an output of the data mode selector circuit to generate a first mixed data;
a first key mixing circuit to combine at least the plurality of key bits with an output of the key mode selector circuit to generate a first mixed key;
a data substitute box (S-box) circuit to perform a data encrypt substitute operation on the first mixed data based on the encrypt mode selected by the data mode selector circuit and to perform a data decrypt substitute operation on the first mixed data based on the decrypt mode selected by the data mode selector circuit; and
a key S-box circuit to perform, in parallel operation with the data S-box circuit, a key encrypt substitute operation on the first mixed key based on the encrypt mode selected by the key mode selector circuit and to perform a key decrypt substitute operation on the first mixed key based on the decrypt mode selected by the key mode selector circuit;
wherein the data S-box circuit is separate from the key S-box circuit.

10. The SoC of claim 9, wherein the data mode selector circuit comprises a multiplexer to perform at least one of a byte mixing operation or a byte substituting operation with respect to the plurality of data bits.

11. The SoC of claim 9, wherein the key mode selector circuit comprises a multiplexer to perform at least one of a byte mixing operation or a byte substituting operation with respect to the plurality of key bits.

12. The SoC of claim 9, wherein the first data mixing circuit further to combine the plurality of data bits with the plurality of key bits to generate the first mixed data.

13. The SoC of claim 9, wherein the data S-box circuit to perform each of the data encrypt substitute operation and the data decrypt substitute operation by a table lookup and the key S-box circuit to perform each of the key encrypt substitute operation and the key decrypt substitute operation by a table lookup.

14. The SoC of claim 9, wherein the hardware accelerator further comprises:
   a data rotation circuit to perform a data rotation operation; and
   a data selector circuit to select 32 hits of data words of the plurality of data bits.

15. A method comprising:
   retrieving, by a processing device, a plurality of data bits;
   selecting, via a data mode selector circuit of the processing device, one of an encrypt mode or a decrypt mode for processing the plurality of data bits;
   retrieving a plurality of key bits;
   selecting, via a key mode selector circuit of the processing device, one of the encrypt mode or the decrypt mode for processing the plurality of key bits;
   combining, via a first data mixing circuit of the processing device, at least the plurality of data bits with an output of the data mode selector circuit to generate a first mixed data;
   combining, via a first key mixing circuit of the processing device, at least the plurality of key bits with an output of the key mode selector circuit to generate a first mixed key;
   executing, via a data substitute box (S-box) circuit of the processing device, at least one of a data encrypt substitute operation on the first mixed data based on the encrypt mode selected by the data mode selector circuit or a data decrypt substitute operation on the first mixed data based on the decrypt mode selected by the data mode selector circuit; and
   executing, via a key S-box circuit of the processing device in parallel operation with the data S-box circuit, at least one of a key encrypt substitute operation on the first mixed key based on the encrypt mode selected by the key mode selector circuit or a key decrypt substitute operation on the first mixed key based on the decrypt mode selected by the key mode selector circuit;
   wherein the data S-box circuit is separate from the key S-box circuit.

16. The method of claim 15 wherein the selecting one of the encrypt mode or the decrypt mode for processing the plurality of data bits comprising performing at least one of a byte mixing operation or a byte substituting operation with respect to the plurality of data bits, wherein the selecting one of the encrypt mode or the decrypt mode for processing the plurality of key bits comprising performing at least one of a byte mixing operation or a byte substituting operation with respect to the plurality of key bits.

17. The method of claim 15 further comprising selecting 32 bits of data words of the plurality of data bits.

18. A non-transitory machine-readable storage medium including instructions that, when executed by a processing device, cause the processing device to perform operations comprising:
   retrieving, by the processing device, a plurality of data bits;
   selecting, via a data mode selector circuit of the processing device, one of an encrypt mode or a decrypt mode for processing the plurality of data bits;
   retrieving a plurality of key bits;
   selecting, via a key mode selector circuit of the processing device, one of the encrypt mode or the decrypt mode for processing the plurality of key bits;
   combining, via a first data mixing circuit of the processing device, at least the plurality of data bits with an output of the data mode selector circuit to generate a first mixed data;
   combining, via a first key mixing circuit of the processing device, at least the plurality of key bits with an output of the key mode selector circuit to generate a first mixed key;
   executing, via a data substitute box (S-box) circuit of the processing device, at least one of a data encrypt substitute operation on the first mixed data based on the encrypt mode selected by the data mode selector circuit or a data decrypt substitute operation on the first mixed data based on the decrypt mode selected by the data mode selector circuit; and
   executing, via a key S-box circuit of the processing device in parallel operation with the data S-box circuit, at least one of a key encrypt substitute operation on the first mixed key based on the encrypt mode selected by the key mode selector circuit or a key decrypt substitute operation on the first mixed key based on the decrypt mode selected by the key mode selector circuit;
   wherein the data S-box circuit is separate from the key S-box circuit.

19. The non-transitory machine-readable storage medium of claim 18, wherein the selecting one of the encrypt mode or the decrypt mode for processing the plurality of data bits comprising performing at least one of a byte mixing operation or a byte substituting operation with respect to the plurality of data bits, wherein the selecting one of the encrypt mode or the decrypt mode for processing the plurality of key bits comprising performing at least one of a byte mixing operation or a byte substituting operation with respect to the plurality of key bits.

20. The non-transitory machine-readable storage medium of claim 19, wherein the instructions that, when executed by the processing device, further cause the processing device to perform an operation comprising selecting 32 bits of data words of the plurality of data bits.

* * * * *